(12) United States Patent
Duong

(10) Patent No.: US 9,344,032 B2
(45) Date of Patent: May 17, 2016

(54) MODULE FOR MIXED PHOTOVOLTAIC AND THERMAL POWER GENERATION FROM SOLAR RADIATION, AND PLANT PROVIDED WITH SUCH MODULES

(75) Inventor: Frédéric Duong, Pezilla-la-Riviere (FR)

(73) Assignee: SUEZ ENVIRONNEMENT (FR)

( * ) Notice: Subject to any disclaimer, the term of this patent is extended or adjusted under 35 U.S.C. 154(b) by 171 days.

(21) Appl. No.: 13/574,678

(22) PCT Filed: Jan. 25, 2011

(86) PCT No.: PCT/IB2011/050317
§ 371 (c)(1),
(2), (4) Date: Aug. 14, 2012

(87) PCT Pub. No.: WO2011/092622
PCT Pub. Date: Aug. 4, 2011

(65) Prior Publication Data
US 2012/0312352 A1    Dec. 13, 2012

(30) Foreign Application Priority Data

Jan. 27, 2010   (FR) ..................................... 10 00300

(51) Int. Cl.
*H01L 31/058*    (2006.01)
*H02S 40/44*    (2014.01)

(52) U.S. Cl.
CPC . *H02S 40/44* (2014.12); *Y02E 10/60* (2013.01)

(58) Field of Classification Search
CPC .............. H01L 31/048; H01L 31/0482; H01L 31/0422
See application file for complete search history.

(56) References Cited

U.S. PATENT DOCUMENTS

| 3,957,537 | A | * | 5/1976 | Baskett | B32B 17/10009 136/251 |
| 4,009,054 | A | * | 2/1977 | Gochermann | H01L 31/048 136/251 |
| 4,057,439 | A | * | 11/1977 | Lindmayer | H01L 31/048 136/251 |
| 4,080,221 | A | * | 3/1978 | Manelas | F24J 2/10 126/684 |
| 4,095,997 | A | * | 6/1978 | Griffiths | F24J 2/20 126/634 |

(Continued)

FOREIGN PATENT DOCUMENTS

| DE | 2935985 A1 | 4/1981 |
| FR | 2727790 A1 | 6/1996 |
| FR | 2924864 A1 | 6/2009 |

*Primary Examiner* — Golam Mowla
(74) *Attorney, Agent, or Firm* — The Belles Group, P.C.

(57) ABSTRACT

The invention relates to a power generation module (M1, M2, M3), using solar radiation, which includes a caisson (2) comprising: a first wall (3) exposed to solar radiation, at least partially made up of a photovoltaic panel (4) with the other part made up of at least one transparent plate (5) or separated photovoltaic cells; at least one second dark wall spaced apart from the inner surface of the first wall (3); an intake (9) for fresh or recycled air with a view to circulating air inside the caisson between the walls; and an outlet (13a) for the air that swept through the inside of the caisson and which was heated by the part of the radiation that passed through the first wall including the transparent plate, the power being generated as electricity by the photovoltaic panel and as thermal power using the heated air.

18 Claims, 4 Drawing Sheets

(56) References Cited

U.S. PATENT DOCUMENTS

| | | | | |
|---|---|---|---|---|
| 4,137,097 A | * | 1/1979 | Kelly | F24J 2/0477 |
| | | | | 126/711 |
| 4,147,560 A | * | 4/1979 | Gochermann | H01L 31/048 |
| | | | | 136/251 |
| 4,210,462 A | * | 7/1980 | Tourneux | B29C 43/56 |
| | | | | 136/251 |
| 4,249,958 A | * | 2/1981 | Baudin | B32B 17/10036 |
| | | | | 136/251 |
| 5,573,600 A | | 11/1996 | Hoang | |
| 5,589,006 A | * | 12/1996 | Itoyama | E04D 3/366 |
| | | | | 126/623 |
| 6,018,123 A | | 1/2000 | Takada et al. | |
| 6,307,145 B1 | * | 10/2001 | Kataoka | B32B 17/04 |
| | | | | 136/251 |
| 6,515,217 B1 | * | 2/2003 | Aylaian | H01L 31/048 |
| | | | | 136/244 |
| 6,800,801 B2 | * | 10/2004 | Sasaoka | H01L 31/048 |
| | | | | 126/621 |
| 2005/0161074 A1 | * | 7/2005 | Garvison | F24J 2/5228 |
| | | | | 136/246 |

* cited by examiner

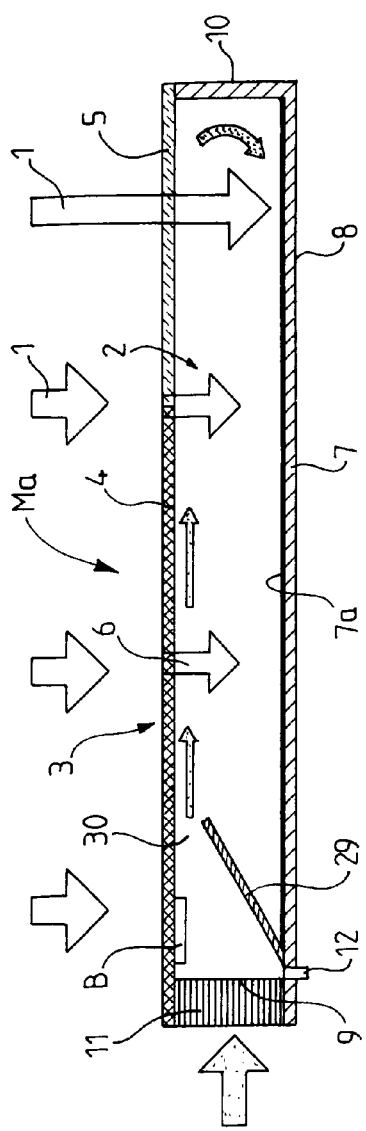
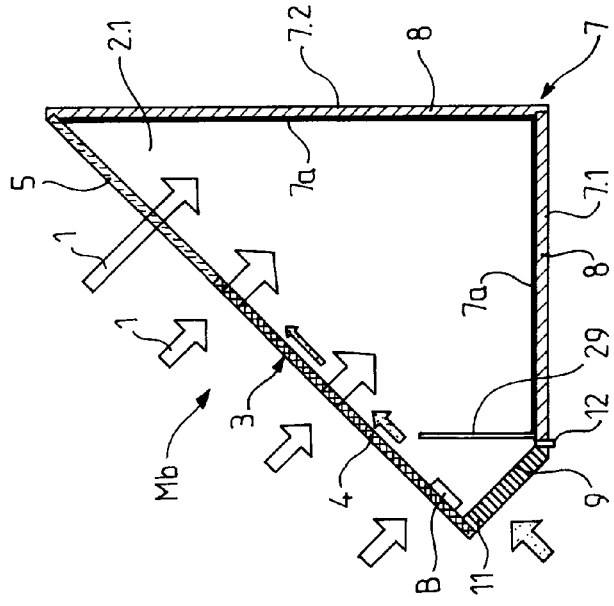

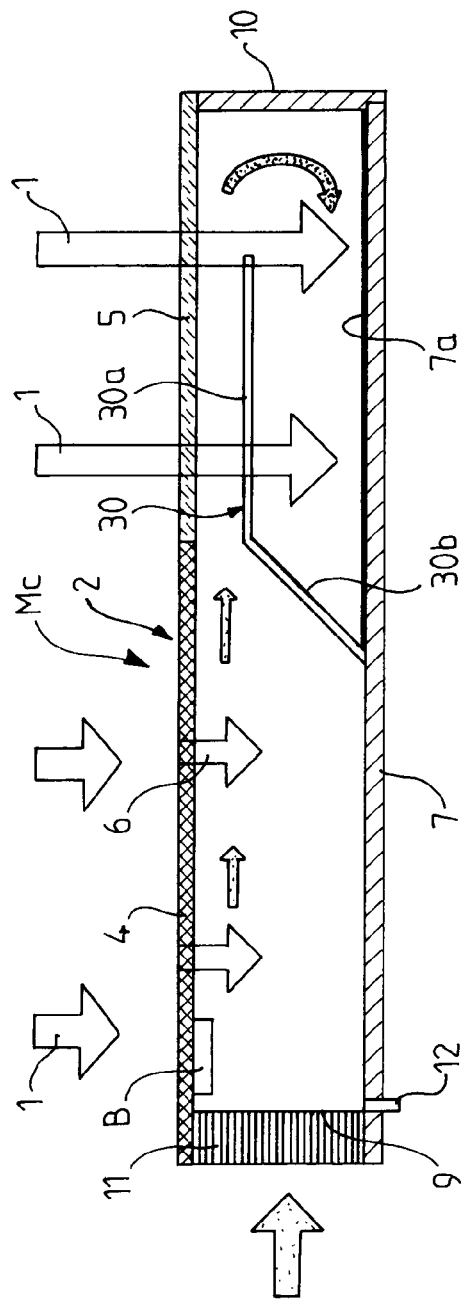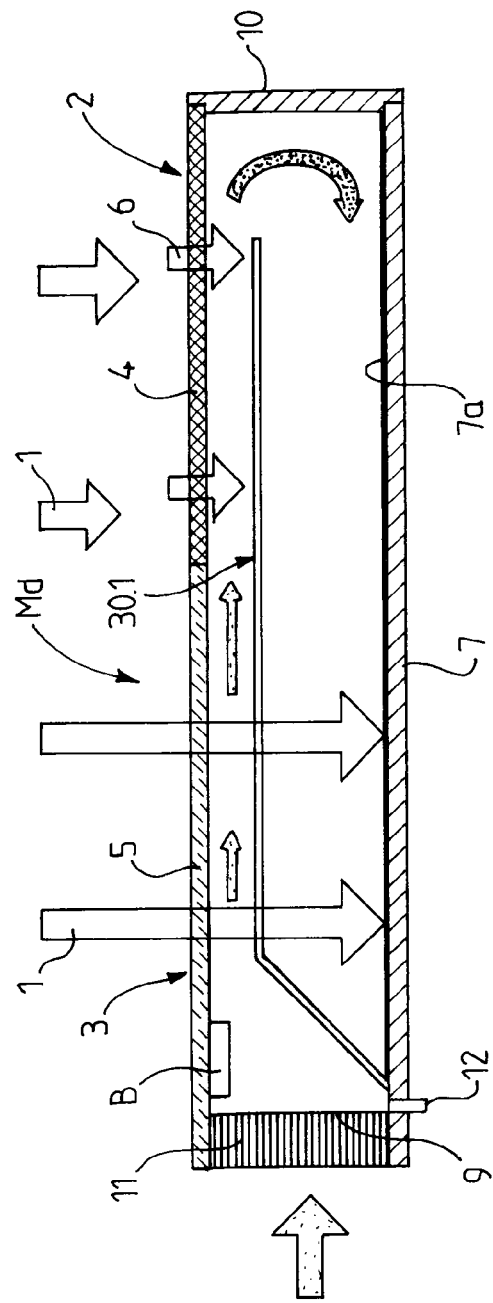

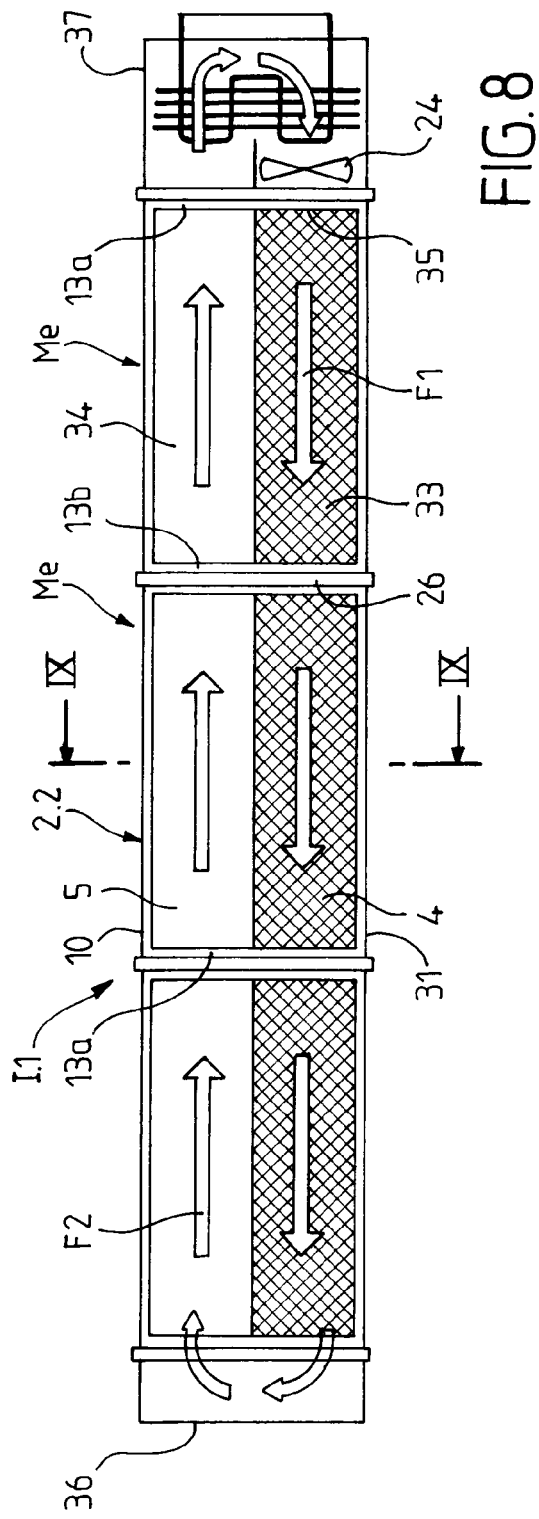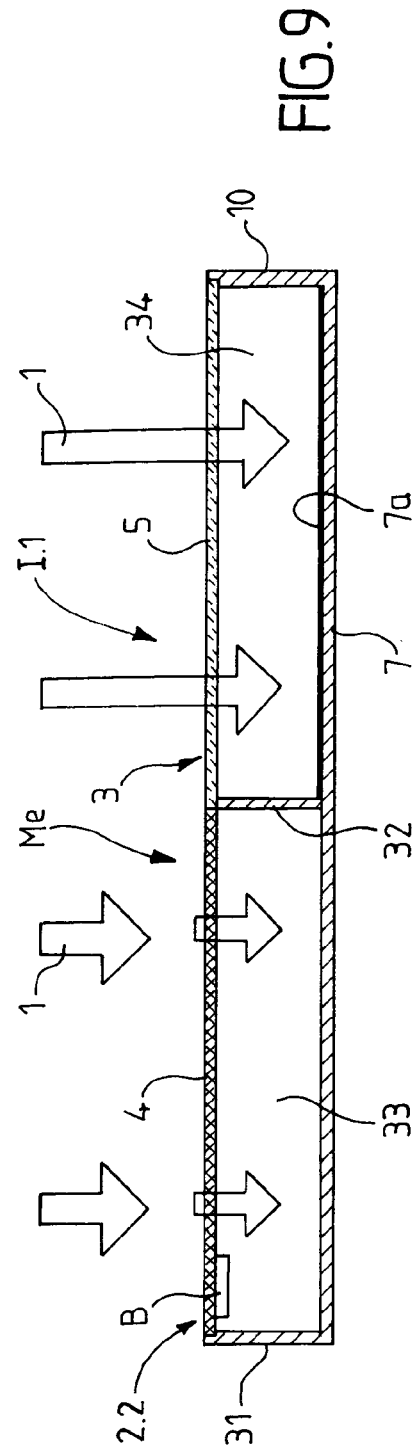

MODULE FOR MIXED PHOTOVOLTAIC AND THERMAL POWER GENERATION FROM SOLAR RADIATION, AND PLANT PROVIDED WITH SUCH MODULES

PRIORITY

Priority is claimed as a national stage application, under 35 U.S.C. §371, to PCT/IB2011/050317, filed Jan. 25, 2011, which claims priority to French Application No. 1000300, filed Jan. 27, 2010. The disclosures of the aforementioned priority applications are incorporated herein by reference in their entirety.

The invention relates to the design of a module for power generation from solar radiation, which includes at least one photovoltaic panel for generating electrical power from solar radiation.

The efficiency of the conversion of incident solar energy to electrical power by a photovoltaic panel is in the range from 6% to 15%. Consequently, most of the solar radiation, amounting to approximately 90%, is reflected and converted to heat which is dissipated by convection and radiation towards the outside, this solar energy being lost; moreover, the heating of the cells substantially degrades their photovoltaic conversion efficiency.

Photovoltaic panels available on the market at the present time are essentially composed of opaque photovoltaic cells which are juxtaposed and inserted in a transparent support made of glass or resin. Photovoltaic panels can be partially translucent, in other words composed of translucent photovoltaic cells or opaque cells spaced apart; in this case, the solar radiation that is not converted to electricity passes through the cells, facilitating the recovery of the thermal energy. These translucent photovoltaic panels are more costly than the conventional panels with opaque cells which have the sole function of generating electricity, and consequently they are not marketed at present.

U.S. Pat. No. 6,018,123 discloses various embodiments of modules for power generation from solar radiation which use photovoltaic cells. The overall energy recovery could still be improved.

The object of the invention is, above all, to provide, at the lowest possible cost, a module providing improved power generation from solar radiation while using ordinary photovoltaic panels, in other words panels which have partially or totally opaque surfaces.

According to the invention, a module for power generation from solar radiation includes a casing, comprising:
a first wall exposed to solar radiation and provided with photovoltaic cells,
at least a second wall, spaced apart from the inner surface of the first wall,
an intake for fresh air, to provide air circulation inside the casing,
and an outlet for the air which has been heated, the power being generated as electricity by the photovoltaic cells and as heat from the heated air, and is characterized in that:
the first wall is partially made up of a photovoltaic panel with the other part made up of a transparent plate,
the space between the two walls is free,
the inner face of the second wall is dark,
the air circulates between the walls, thereby cooling the inner faces of the photovoltaic cells, and is heated by the part of the radiation that has passed through the first wall including the transparent plate, and by contact with the dark face.

Advantageously, the second dark wall has an inner face forming a black body, on at least a part of this wall, and is provided with outwardly facing thermal insulation. The black body can be formed on the second wall by means of a black inner coating.

Generally, the first panel exposed to the light has a rectangular shape, and the photovoltaic panel and the transparent plate extend along the larger dimension of the wall, and are placed in sequence along the smaller dimension of the wall. The photovoltaic panel and the transparent plate can be coplanar, adjacent or separate.

The air intake of the casing can be located on a long side, while the air outlet is provided on a short side. The air intake is advantageously provided with a filter, particularly a metal or synthetic fiber filter, for providing dynamic balancing of the air flow throughout the inside of the module. The pressure drop created by the filter is at least 10 daPa, in order to provide automatic balancing.

The module is preferably open on the side opposite the air outlet, to allow connection to another module located upstream relative to the air flow.

A deflector is advantageously provided at the module intake, along the whole dimension of this intake, the deflector being inclined from the inner wall toward the first outer wall on the solar flux side, so as to cause an acceleration of the air flow under the first wall and promote dynamic convection.

The casing can be in the shape of a rectangular parallelepiped. In a variant, the casing has a prismatic shape with a cross section forming a right-angled triangle, the first wall exposed to the light being positioned along the hypotenuse of the triangular section, and the air intake being located in a cut-off corner of the lower acute angle of the triangle.

The module can comprise, in the area of the transparent plate, an intermediate deflector which can direct the air against the inner face of the transparent plate, and which comprises an intermediate wall parallel to the transparent plate which ends before reaching the edge wall of the casing opposite the intake.

The area of the casing wall opposite the first wall located under the transparent deflector is dark, and preferably black.

The transparent plate of the first wall can be located on the intake side, in which case the transparent intermediate deflector runs from the vicinity of the casing intake and extends substantially over the whole width of the casing, under both the transparent plate and the photovoltaic panel.

The casing can be open on its opposite shorter sides, and can be closed on its long sides, the air entering through the opening on a short side and exiting through the opening on the opposite side, and a longitudinal separation is provided in the casing to form two compartments, corresponding to the transparent plate and the photovoltaic panel, which are placed in sequence along the width.

The invention also relates to a plant comprising a plurality of modules assembled together, as defined above, and positioned in sequence, characterized in that the fresh air intake is at one end, with circulation in the aligned compartments located under the photovoltaic panels, inversion of the circulation at the end of the last module in the sequence, and the return of the air in the aligned compartments located under the transparent plates, this air being heated. An air/water exchanger for producing hot water can be provided at the heated air outlet end. The air cooled by the exchanger may or may not be reintroduced upstream of the panels.

The installation can be composed of a plurality of modules comprising assembly frames with edges projecting beyond the panels; the modules are assembled by means of grippers having terminal arms which clamp the edges so as to be fastened thereto, each gripper comprising, in an intermediate area, a housing for receiving a sealing gasket and, in the part more distant from the panel, a fin, the grippers of two adjacent panels being turned in opposite directions in such a way that their fins can be engaged in a channel which clamps and holds the grippers and provides sealing between each module. The assembly frames and the channels can be made of metal or composite material, by extrusion or bending.

In addition to the arrangements described above, the invention is composed of a certain number of other arrangements which are described more fully below with regard to exemplary embodiments described with reference to the appended drawings, although these embodiments are not limiting in any way. In these drawings:

FIG. 4 is a section, similar to that of FIG. 2, through a variant embodiment of the module, with an intermediate deflector.

FIG. 5 is a section similar to that of FIG. 2 through another variant embodiment of a module of prismatic shape with a substantially triangular cross section.

FIG. 6 is a section, similar to that of FIG. 2, through a variant module with a transparent deflector.

FIG. 7 is a section, similar to that of FIG. 6, through a variant embodiment with a transparent intermediate deflector.

FIG. 8 is a plan view of a plant with three modules juxtaposed in sequence according to another variant of the invention, and FIG. 9 is an enlarged cross section taken through the line IX-IX of FIG. 8.

Figure 1:
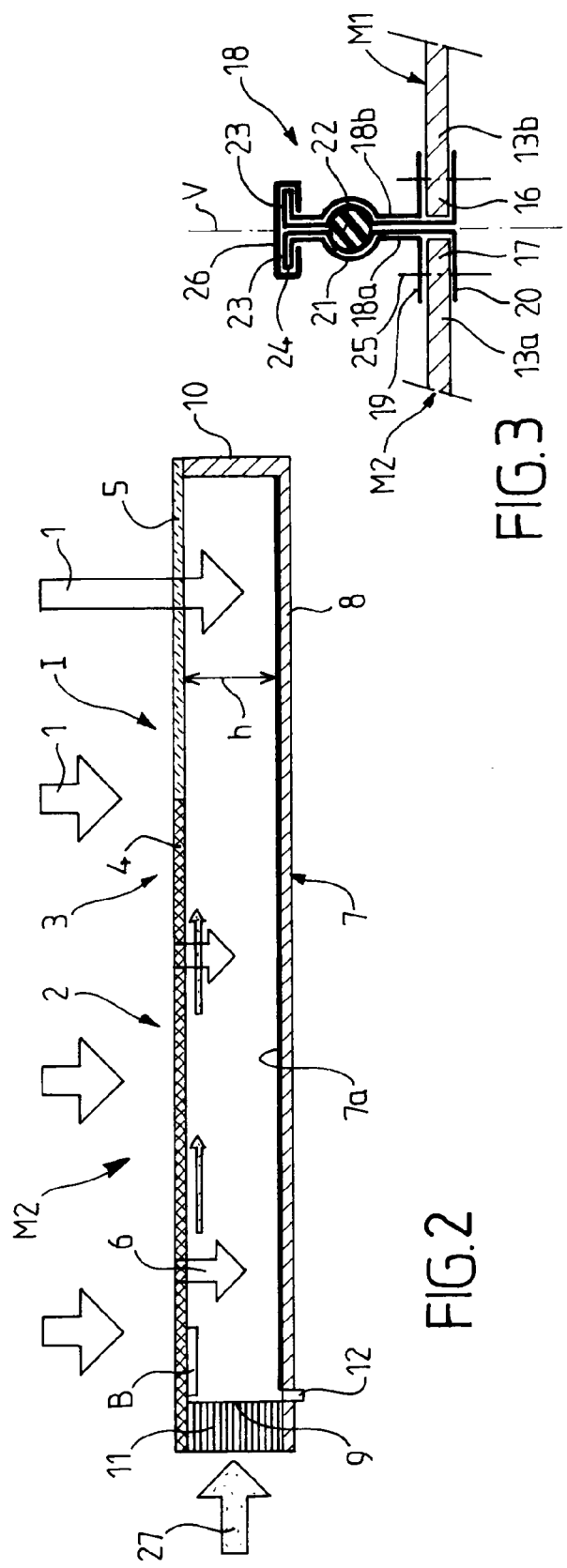
FIG. 1 is a plan view of three modules according to the invention which are juxtaposed, with air intakes in parallel, for power generation.

FIG. 1 of the drawings shows a plant I for generating power from solar radiation, made up of a plurality of identical modules, namely three modules M1, M2, M3 in the illustrated example, assembled for parallel air intake. The solar radiation is indicated schematically by the arrows 1 in FIG. 2. Each module M1, M2, M3 comprises a sealed casing 2 which, in the embodiment of FIGS. 1 and 2, has the shape of a rectangular parallelepiped.

Figure 2:
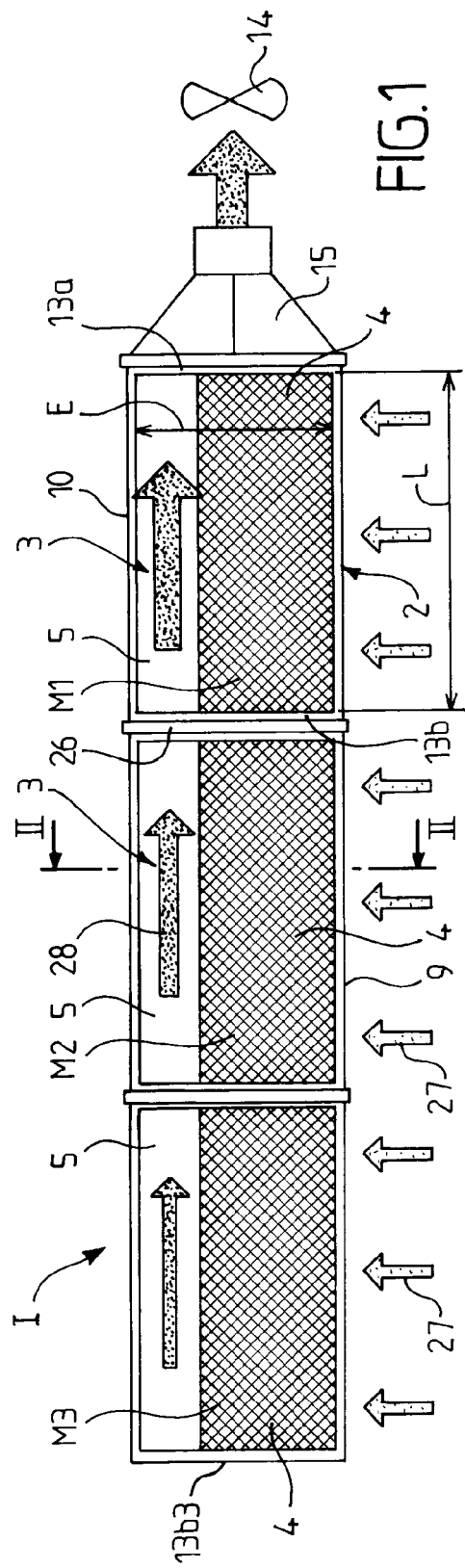
FIG. 2 is an enlarged cross section through a module, taken along the line II-II of FIG. 1.

The casing 2 includes a first wall 3, exposed to the light, and at least partially made up of a photovoltaic panel 4, with the other part made up of a transparent plate 5, notably a plate made of glass, thin film, or polycarbonate, which allows a maximum of light to pass through. The photovoltaic panel 4 is made up of juxtaposed opaque cells between which there are transparent interstices, such that a small part of the solar radiation passes through the panel 4, as shown by the arrows 6 (FIG. 2). The casing 2 includes a second wall 7, parallel to the first wall 3, and spaced apart from it by a distance h.

The first wall 3 has a rectangular shape. As shown in FIG. 1, the photovoltaic panel 4 and the transparent plate 5 are connected edge to edge in a sealed way, extend along the whole of the larger dimension L of the wall 3 and are placed in sequence along the width (the smaller dimension) E of the wall.

The inner face 7a (FIG. 2) of the second wall 7 is dark, and is preferably a black body which absorbs the maximum incident radiation. For this purpose, the face 7a can be provided with a black body coating. Toward the outside of the side opposite the solar radiation, the wall 7 is provided with thermal insulation 8.

An air intake 9 is provided along an open long side of the casing 2. The opposite long side is closed by a wall 10 connected in a sealed way to the second wall 8 and to the transparent plate 5. The intake 9 is provided with a filter 11, preferably a removable metal or synthetic filter, designed to create a sufficient pressure drop to balance the air flow rate along the length of the panel. This pressure drop is generally about 10 to 20 daPa. An electrical junction box B is provided on the inner face of the panel 4, toward the intake 11. A condensation drain 12 is provided at the lowest point of the module, which is generally located in the vicinity of the filter 11, as shown in FIG. 2.

Each module M1, M2, M3 includes openings along its short sides 13a, 13b. The opening of the extreme downstream module M1, along the short side 13a, is exposed to the suction of a fan unit 14, and serves as the outlet for the air which has been heated in the plant I. The other open short side 13b allows connection to the adjacent module M2.

Each casing 2 is self-supporting and can be arranged horizontally as shown in FIG. 2, or vertically, or on a diagonal plane.

Figure 3:
FIG. 3 is an enlarged vertical section through the device for assembling two adjacent modules.

The open short side 13a of the last module M1 in the direction of flow of the air is connected to a funnel 15 which is itself connected to the intake of the unit 14 which sends the hot air toward a consumer unit not shown in FIG. 1. The open short side 13b of the module M1 is connected to the short side 13a of the module M2, and so on. The connection between the edge 16 (FIG. 3) of the short side 13b of the module M1 and the edge 17 of the short side 13a of the module M2 is made with a device 18 shown in FIG. 3.

This device 18 comprises a first gripper 18a formed by a sheet bent along two parallel lines or an extruded section of metal or composite material. One end of the gripper has two parallel branches 19, 20 which clamp the edge 17. The branches 19, 20 are continued, on the outer side of the casing, by a web bent at 90° and having an outwardly convex part 21 which forms substantially one half of a housing for a gasket 22. The gripper 18a with a double web extends in a direction substantially orthogonal to the wall 3, and is then bent outward at 90° along a fin 23 whose two webs meet along an edge 24 of the sheet bent at 180°. A similar gripper 18b, symmetrical to the gripper 18a with respect to a plane V orthogonal to the wall 3, is fitted on the edge 16. The arms 19 and 20 are fastened to the edges 17 and 16 by pins or studs 25. A channel 26 with a substantially C-shaped cross section is engaged around the opposing fins 23 so as to clamp them together, provide sealing between the casings, and align and secure the assembly.

This assembly using grippers and channels is carried out along the four edges of the rectangular openings 13b, 13a of adjacent modules such as M2, M1. An assembly of the same type is carried out between the end 13a of the module M1 and the funnel 15. The assembly can be carried out simply and rapidly and does not require any special tools.

The short end face 13b3 of the module M3, located at the farthest upstream end, is closed in such a way that air can only enter the modules of the plant by following the direction of the arrows 27, in other words perpendicularly to the open long sides of the casings. Inside the casings, the air essentially circulates in the direction of the arrows 28, in other words parallel to the long sides of the modules. In the arrangement of a plurality of modules assembled in sequence in order to channel the air circulation under the transparent plates 5, the suction can be entirely concentrated on the width of the last plate 5 by providing a wall which partially closes the end 13a of the downstream module M1 at a right angle to the panel 3.

The operation of the modules and of the plant I is as follows.

The solar radiation (arrows 1) falls on the exposed walls 3. The photovoltaic panels 4 convert some of this radiated energy into electrical power. Although the photovoltaic cells are opaque, a fraction of the radiation, indicated by the arrows 6, penetrates into the casing 2 through the interstices provided between the cells. The fraction 6 of the radiation is absorbed by the face 7a whose temperature rises progressively. At the position of the transparent area 5, most of the solar radiation impinging directly on the plate 5 penetrates into the casing and heats the opposing face 7a which forms a black body.

The fresh air which enters through the filters 11, in the direction of the arrows 27, cools the inner faces of the photovoltaic panels 4, thereby helping to keep the electrical efficiency of the panels 4 at a high level. The air is heated to a small extent under the panels 4, and is then essentially heated at the position of the transparent plates 5 and the opposing faces 7a.

By way of non-limiting example, the fresh air can enter at a temperature of 10° C. and flow out at a temperature of about 50° C. at high insolation levels. For guidance, the solar radiation striking a surface perpendicular to the solar radiation is about 900 W/m$^2$ at the maximum.

The hot air is extracted through the funnel 15 and is sent to a direct or indirect user via an air/water exchanger, for the purpose of domestic water heating, space heating, the heating of greenhouses, or the like.

The filters 11 serve to stop the entry of dust, and also contribute, by their pressure drop, to the provision of a uniform and balanced air flow in the various modules of the plant I.

A module according to the invention can thus be used for the generation of electrical power by means of the panel 4 with improved efficiency of the photovoltaic cells due to the cooling provided by the fresh air, and for the generation of thermal power by means of the heated air which recovers some of the solar energy under the transparent plate 5.

FIG. 4 shows, in a vertical cross section similar to that of FIG. 2, a variant embodiment Ma of the module which is essentially similar to the module M of FIGS. 1 and 2. The various parts of this module Ma which are identical to, or have similar functions to, the parts described with reference to FIGS. 1 and 2 are indicated by the same reference numerals, and will not be described again.

The module Ma includes at its intake, downstream of the filter 11, a deflector 29 inside the casing, positioned so as to direct the air flow against the inner face of the photovoltaic panel 4. The deflector 29, which can be made of an opaque material, bears with its upstream edge on the face 7a forming a black body, and extends progressively away from the wall 7, in the downstream direction, toward the photovoltaic panel 4. The downstream edge of the deflector 9 is at a short distance from the panel 4 and creates a passage 30 of reduced cross section for the air circulating in the casing. The reduction of the cross section of the passage 30 causes an increase in the velocity of the air against the inner face of the wall 3, thus creating the Coanda effect by which the air flow is essentially attached to the inner face of the wall 3. The cooling of the photovoltaic panel 4 is thus improved by forced convection. The deflector 29 is formed by a strip extending along the whole length of the casing 2. The module Ma can be used to generate electrical power and thermal power in conditions which are improved relative to those of FIG. 2.

FIG. 5 shows, in a vertical cross section similar to that of FIGS. 2 and 4, another variant Mb of the power generation module. The module Mb includes a prismatic casing 2.1 whose cross section is essentially in the shape of a right-angled triangle. The first wall 3, exposed to the radiation, is placed on the hypotenuse of the right-angled triangle. Parts which are identical to those of figures described previously are indicated by the same references and will not be described again. The filter 11 is positioned on a cut-off corner, preferably orthogonal to the wall 3, located at the lower acute angle of the cross section. The wall 7 opposite the wall 3 is formed by a right angle dihedral composed of a horizontal part 7.1 whose inner face 7a forms a black body, notably by being given an appropriate coating. The part 7.1 is provided with thermal insulation 8 on the outside. The other part 7.2 of the dihedral is vertical and, like the part 7.1, includes an inner face 7a forming a black body and external thermal insulation 8 on the outside. The module Mb is designed to be installed with its part 7.1 horizontal, in such a way that the wall 3, turned towards the sun, has a favorable inclination. The module Mb includes, in the same way as the module Ma, a deflector 29 immediately downstream of the intake, to direct the air flow against the inner face of the photovoltaic panel 4. With the arrangement of FIG. 5, the deflector 29 is vertical and fixed to the lower horizontal part 7.1.

FIG. 6 shows another variant embodiment Mc of a module according to the invention. The casing 2 includes, within itself, at the position of the transparent plate 5, an intermediate deflector 30 made of a transparent material, notably polycarbonate or thin transparent membrane, capable of directing the air against the inner face of the transparent plate 5 in order to increase the circulation velocity and promote heat exchange by convection. The transparency of the deflector 30 allows the radiation to reach the face 7a forming a black body, in such a way that the generation of thermal power is not reduced by the presence of this deflector 30. This deflector 30 includes a part 30a parallel to the wall 5, which runs from a position opposite the junction between the panel 4 and the plate 5, and which ends at a sufficient distance from the wall 10 to allow the air to pass along the side of the deflector 30a turned toward the wall 7a and to be heated in this area. The upstream part 30b of the deflector 30 is formed by an inclined strip, running from the upstream edge of the part 30a and joining the face 7a. The part of the face 7a forming a black body may be provided solely in the area extending between the upstream edge of the strip 30b and the wall 10.

FIG. 7 shows a variant embodiment Md of the module wherein the transparent plate 5 of the wall 3 is located at the air intake end, while the photovoltaic panel 4 is located downstream of the plate 5. The arrangement with respect to the width of the casing is therefore the reverse of that shown in the preceding figures. A transparent deflector 30.1, similar to the deflector 30 of FIG. 6, is provided inside the casing, and runs from a position in the proximity of the intake filter 11. The air passing under the photovoltaic panel 4 is heated to some extent under the transparent plate 5, but the cooling of the panel 4 remains entirely satisfactory because the velocity of the air is increased by the passage cross section. The heating of the air is continued essentially in the area between the deflector 30.1 and the face 7a forming a black body.

FIGS. 8 and 9 show another variant Me of a module according to the invention. The casing 2.2 of the module is closed on its two long sides, by the walls 10 and 31 respectively (FIG. 9), and is open on its two short sides 13a, 13b. The casing also includes a longitudinal partition 32, parallel to the long sides 10, 31 and orthogonal to the walls 3 and 7. The partition 32 is perpendicular to the junction between the photovoltaic panel 4 and the transparent plate 5, and defines two separate compartments 33, 34. The compartment 33 contains air flowing in the "forward" direction indicated by the arrow F1 (FIG. 8), under the photovoltaic panel 4, and the compartment 34 contains air flowing in the "return" direction indicated by the arrow F2 (FIG. 8) under the transparent plate 5. The compartments 33 and 34 are placed in sequence along the width of the casing.

FIG. 8 shows a plant I.1 wherein a plurality of modules Me, three in the illustrated example, are positioned in series. The fresh air intake is provided at an end 35, preferably fitted with a filter similar to the filter 11 of the preceding embodiments. The fresh air circulates as indicated by the arrows F1 in the aligned compartments 33 of the successive modules. At the outlet of the last module, a closing casing 36 is provided to deflect the air flow leaving the compartment 33 toward the intake of the compartment 34 of this last module. The air returns in the direction of the arrows F2 in the aligned compartments 34, and passes under the transparent plates 5, thus being heated, notably by contact with the face 7a forming a black body. In the compartment 3, it is not necessary to arrange the face opposite the panel 4 in the form of a black body.

An air/water heat exchanger 37 is advantageously positioned at the outlet of the compartment 34 of the first module Me, as shown in FIG. 8. The hot air transfers its heat to the water in this exchanger 37, and is recycled by the fan 24 toward the compartments 33. The hot water produced in this way is sent to a user (not shown) such as a domestic hot water system. In this exemplary embodiment, the air moves in a closed circuit, and the hot water generation is added to the electricity generation provided by the photovoltaic panels 4.

Regardless of the specific embodiment, the invention enables the electricity generation efficiency to be improved by cooling the photovoltaic cells by means of the air circulation, and enables the thermal power generation to be increased by means of the air which sweeps the transparent wall 5 and the face 7a forming a black body exposed to radiation through the transparent wall 5.

In the example of FIG. 8, the temperature of the hot water circuit can be in the range from 40° to 55°, and the temperature of the air at the intake 35 can be about 45° C., rising to about 50° C. at the closing casing 36, 55° C. at about the mid-point of the return path, and 60° C. at the outlet of the plant I.1 leading to the exchanger 37. The air temperatures can be adjusted by modifying the flow rate of the circulating air.

The ratio of the width of the photovoltaic panel 4 to the width of the transparent panel 5 can vary considerably according to the desired quantities of electrical and thermal power. The height h of the casing is determined according to the desired air flow conditions.

The invention claimed is:

1. A module for power generation from solar radiation comprising a casing including:
a first wall exposed to solar radiation and provided with photovoltaic cells,
at least a second wall, spaced apart from the inner surface of the first wall,
an intake for fresh air, to provide air circulation inside the casing,
and an outlet for the air which has been heated,
the power being generated as electricity by the photovoltaic cells and as heat from the heated air, wherein:
the first wall is partially made up of a photovoltaic panel with the other part made up of a transparent plate,
a free space is formed between the first and second walls,
an inner face of the second wall, which faces the free space and the first wall, is dark, and
the air circulates in the free space in contact with the photovoltaic panel, the transparent plate, and the dark inner face of the second wall, thereby cooling inner faces of the photovoltaic cells, the air circulating in the free space being heated by the part of the radiation that has passed through the first wall including the transparent plate and by contact with the dark inner face of the second wall.

2. The module as claimed in claim 1, wherein the second dark wall has an inner face forming a black body, on at least a part of this wall, and is provided with outwardly facing thermal insulation.

3. The module as claimed in claim 1, wherein the first wall exposed to the light has a rectangular shape, characterized in that the photovoltaic panel and the transparent plate extend along the larger dimension of the wall, and are placed in sequence along the smaller dimension of the wall.

4. The module as claimed in claim 3, wherein the photovoltaic panel and the transparent plate are coplanar.

5. The module as claimed in claim 1, wherein the air intake in the casing is located on a long side of the casing, while the air outlet is provided on a short side.

6. The module as claimed in claim 1, wherein the air intake is provided with a filter, particularly a metal or synthetic filter, which makes it possible to obtain dynamic balancing of the air flow in the module.

7. The module as claimed in claim 6, wherein the pressure drop created by the filter is at least 10 daPa.

8. The module as claimed in claim 1, wherein the module is open on the side opposite the air intake to allow connection to a module located upstream with respect to the air flow.

9. The module as claimed in claim 1, wherein a deflector is advantageously provided at the module intake, along the whole dimension of this intake, this deflector being inclined from the dark wall toward the first wall so as to create an air flow under the first wall.

10. The module as claimed in claim 1, wherein the casing is in the shape of a rectangular parallelepiped.

11. The module as claimed in claim 1, wherein the casing has a prismatic shape with a cross section forming a right-angled triangle, the first wall exposed to the light being positioned along the hypotenuse of the triangular section, and the air intake being located in a cut-off corner of the lower acute angle of the triangle.

12. The module as claimed in claim 10, wherein the casing comprises, in the area of the transparent plate, a deflector of transparent material which can direct the air against the inner face of the transparent plate, the deflector including a part, parallel to the transparent plate, which ends before reaching the edge wall of the casing opposite the intake.

13. The module as claimed in claim 12, wherein the transparent plate of the first wall is located on the intake side, and the transparent deflector runs from the vicinity of the casing intake and extends substantially over the whole width of the casing, under both the transparent plate and the photovoltaic panel.

14. The module as claimed in claim 1, wherein the casing is open on its opposite short sides, and is closed on its long sides, the air entering through the opening on a short side and exiting through the opening on the opposite side, while a longitudinal separation is provided in the casing to form two compartments, corresponding to the transparent plate and the photovoltaic panel, which are placed in sequence along the width.

15. A plant comprised of a plurality of modules as claimed in claim 1, positioned in sequence, wherein the fresh air intake is at one end, with circulation in the aligned compartments located under the photovoltaic panels, inversion of the circulation at the end of the last module in the sequence, and the return of the air in the aligned compartments located under the transparent plates, this air being heated.

16. The plant as claimed in claim 15, wherein an air/water exchanger for hot water generation is provided at the heated air outlet end.

17. A plant comprised of a plurality of modules as claimed in claim 1, wherein the modules comprise assembly frames with edges projecting beyond the panels, and in that the modules are assembled by means of grippers having terminal arms which clamp the edges so as to be fastened thereto, each gripper including, in an intermediate area, a housing for receiving a sealing gasket and, in the part more distant from the panel, a fin, the grippers of two adjacent panels being turned in opposite directions in such a way that their fins can be engaged in a channel which clamps and holds the grippers.

18. The plant as claimed in claim 17, wherein the assembly frames and the channels are made of metal or composite materials, by extrusion or bending.

* * * * *